(12) United States Patent
Sala

(10) Patent No.: US 11,007,948 B2
(45) Date of Patent: May 18, 2021

(54) DEVICE CONNECTABLE TO THE LUGGAGE BOOT OF A MOTOR VEHICLE FOR QUICKLY PREPARING THE SAME TO SAFELY TRANSPORT ONE OR MORE PACKAGES, LUGGAGE BOOT COMPRISING SAID DEVICE AND MOTOR VEHICLE PROVIDED WITH A LUGGAGE BOOT COMPRISING SAID DEVICE

(71) Applicant: ATHANOR Srl, Vergiate (IT)

(72) Inventor: Giuseppe Sala, Vergiate (IT)

(73) Assignee: ATHANOR SRL, Vergiate (IT)

( * ) Notice: Subject to any disclaimer, the term of this patent is extended or adjusted under 35 U.S.C. 154(b) by 0 days.

(21) Appl. No.: 16/646,299

(22) PCT Filed: Nov. 15, 2017

(86) PCT No.: PCT/IT2017/000254
§ 371 (c)(1),
(2) Date: Mar. 11, 2020

(87) PCT Pub. No.: WO2019/073495
PCT Pub. Date: Apr. 18, 2019

(65) Prior Publication Data
US 2020/0282916 A1 Sep. 10, 2020

(30) Foreign Application Priority Data
Oct. 12, 2017 (IT) .................. 102017000114809

(51) Int. Cl.
*B60R 9/045* (2006.01)
(52) U.S. Cl.
CPC .................... *B60R 9/045* (2013.01)
(58) Field of Classification Search
CPC .. B60R 9/04; B60R 9/00; B60R 9/045; B60R 9/052; B60R 9/048; B60P 7/135
See application file for complete search history.

(56) References Cited

U.S. PATENT DOCUMENTS 3,670,935 A * 6/1972 Hinkston .................. B60R 9/10
224/497
4,358,037 A * 11/1982 Heideman ............... B60R 9/045
224/321

(Continued)

FOREIGN PATENT DOCUMENTS

DE   10 2007 047755   4/2009
FR    2 699 475       6/1994

OTHER PUBLICATIONS

International Search Report, PCT/IT2017/000254, dated Apr. 24, 2018.
Written Opinion, PCT/IT2017/000254, dated Apr. 24, 2018.

*Primary Examiner* — Brian D Nash
(74) *Attorney, Agent, or Firm* — Nixon & Vanderhye

(57) ABSTRACT

Disclosed is a device connectable to a luggage boot of a motor vehicle to quickly and easily safely transport packages. The device includes a first rod connectable to a bar of the luggage boot, parallel thereto. The device further includes a second rod hinged to the first rod at a respective end thereof. The second rod is rotatable with respect to the first rod between a first position at which the second rod is arranged substantially parallel to the bar of the luggage boot, and a second position at which the second rod is arranged substantially transversely to the bar of the luggage boot. The device also includes a mechanism so the second rod may be reversibly locked in the first or second positions. Also disclosed is a luggage boot including the device and to a motor vehicle provided with a luggage boot including the device.

20 Claims, 10 Drawing Sheets

(56) References Cited

U.S. PATENT DOCUMENTS

| | | | | |
|---|---|---|---|---|
| 5,071,050 A * | 12/1991 | Pudney | | B60R 9/045 224/321 |
| 5,340,007 A * | 8/1994 | Jeuffray | | B60R 9/045 224/315 |
| 5,377,890 A * | 1/1995 | Brunner | | B60R 9/045 224/309 |
| 5,395,024 A * | 3/1995 | Luchtenberg | | B60R 9/045 224/309 |
| 5,411,196 A * | 5/1995 | Lee, Jr. | | B60P 7/135 224/315 |
| 5,511,709 A * | 4/1996 | Fisch | | B60R 9/045 224/316 |
| 5,556,221 A * | 9/1996 | Brunner | | F16B 7/0493 403/322.4 |
| 5,560,498 A * | 10/1996 | Porter | | B60R 9/10 211/20 |
| 5,577,649 A * | 11/1996 | Lee, Jr. | | B60P 7/135 224/315 |
| 6,286,739 B1 | 9/2001 | Stapleton | | |
| 6,811,066 B2 * | 11/2004 | Aftanas | | B60R 9/045 224/321 |
| 6,959,845 B2 * | 11/2005 | Aftanas | | B60R 9/045 224/321 |
| 7,066,364 B2 * | 6/2006 | Kmita | | B60R 9/045 224/321 |
| 7,458,490 B2 * | 12/2008 | Klinkman | | B60R 9/045 224/321 |
| 7,926,686 B2 * | 4/2011 | Salvador | | B60R 9/045 224/321 |
| 8,028,875 B2 * | 10/2011 | Kmita | | B60R 9/045 224/321 |
| 8,096,454 B2 * | 1/2012 | Aftanas | | B60R 9/045 224/321 |
| 8,308,035 B2 * | 11/2012 | Polewarczyk | | B60R 9/045 224/321 |
| 8,485,403 B2 * | 7/2013 | Stahl | | B60R 9/045 224/321 |
| 8,528,799 B2 * | 9/2013 | Michie | | B60R 9/052 224/321 |
| 10,279,748 B2 * | 5/2019 | Aftanas | | B60R 9/04 |
| 2003/0080168 A1 | 5/2003 | Aftanas | | |
| 2004/0134949 A1 * | 7/2004 | Aftanas | | B60R 9/045 224/321 |
| 2006/0060621 A1 | 3/2006 | Klinkman et al. | | |
| 2006/0163297 A1 * | 7/2006 | Moreau | | B60R 9/045 224/321 |
| 2008/0252100 A1 | 10/2008 | Salvador et al. | | |
| 2009/0242599 A1 | 10/2009 | Stahl et al. | | |
| 2020/0148280 A1 * | 5/2020 | Elder | | B62D 33/0222 |

* cited by examiner

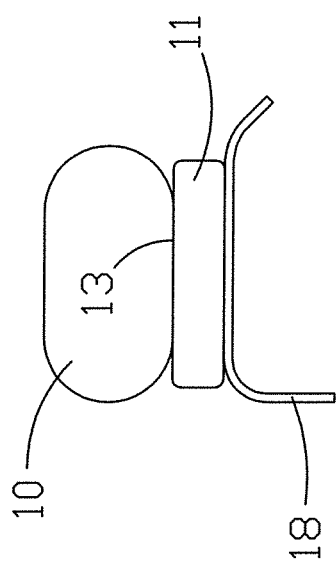
FIG. 2
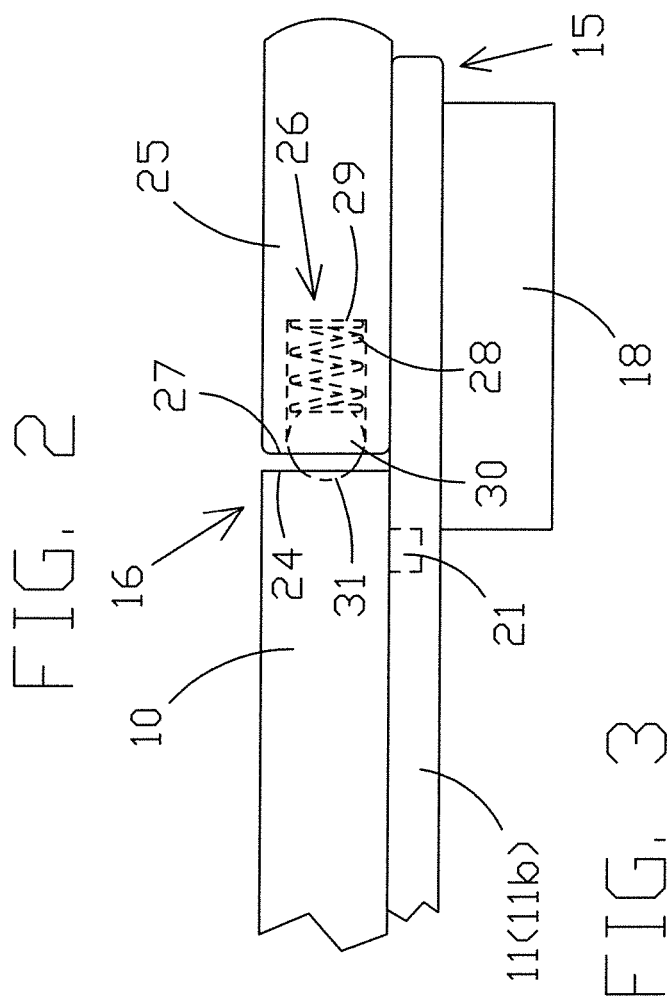
FIG. 3
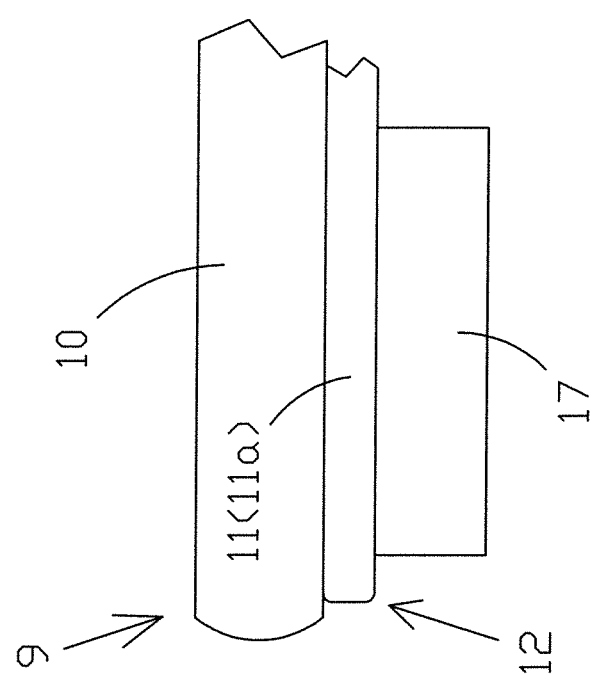

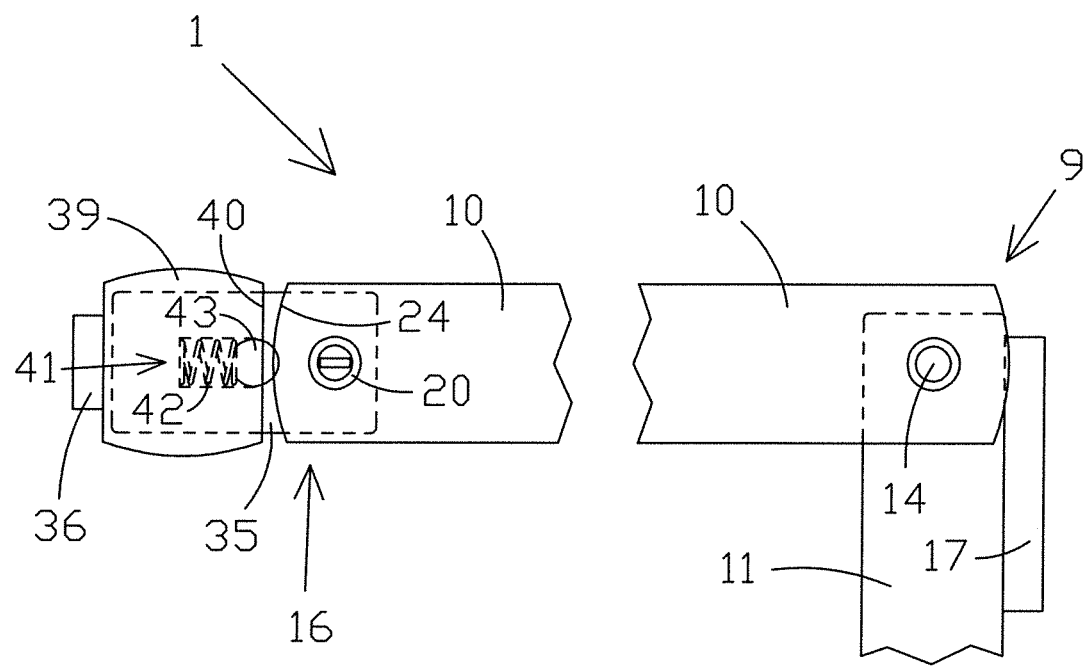
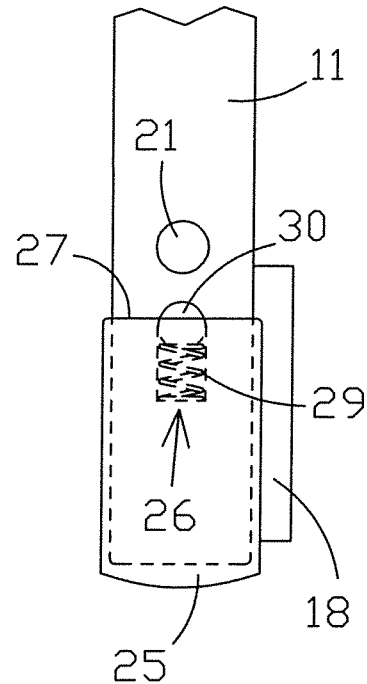
FIG. 4

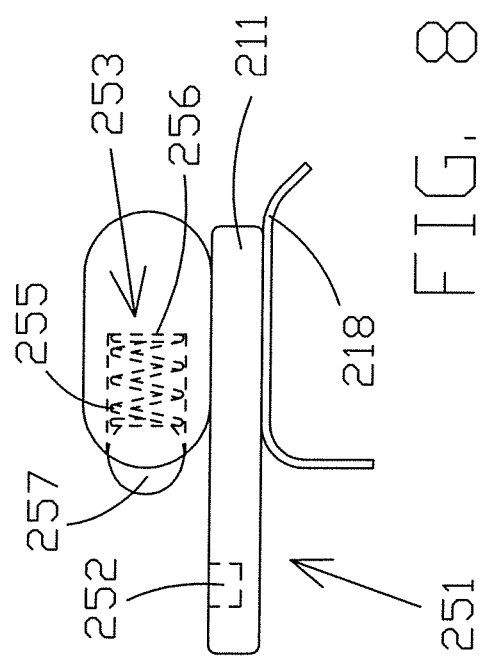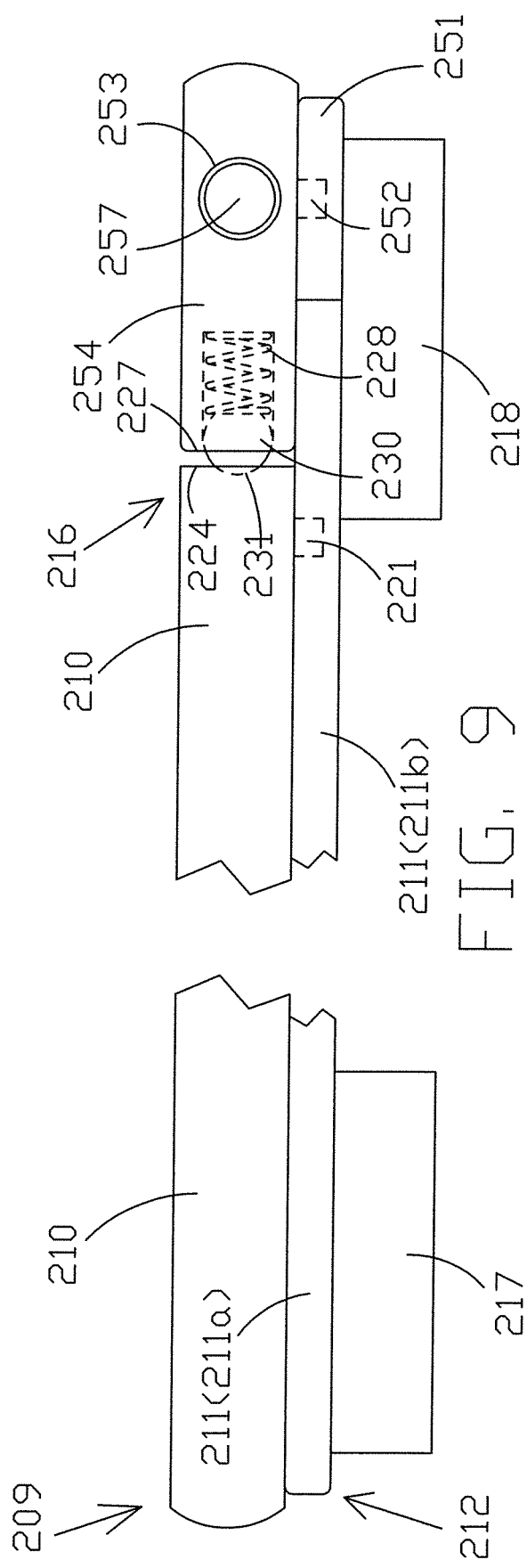

DEVICE CONNECTABLE TO THE LUGGAGE BOOT OF A MOTOR VEHICLE FOR QUICKLY PREPARING THE SAME TO SAFELY TRANSPORT ONE OR MORE PACKAGES, LUGGAGE BOOT COMPRISING SAID DEVICE AND MOTOR VEHICLE PROVIDED WITH A LUGGAGE BOOT COMPRISING SAID DEVICE

SECTOR OF APPLICATION OF THE INVENTION

The present invention relates to the field of accessories for motor vehicles. Namely, the present invention relates to a device connectable to the luggage boot of a motor vehicle for quickly preparing the latter to safely transport one or more packages. For convenience of disclosure, the expression "motor vehicle" here and later in the present description means any vehicle that can be provided with a luggage boot.

The present invention also relates to a luggage boot for motor vehicles comprising the aforesaid device and to a motor vehicle provided with a luggage boot comprising the aforesaid device.

OVERVIEW OF THE PRIOR ART

The luggage boot of a motor vehicle usually comprises a pair of metal bars fixed to the roof of the vehicle outside the passenger compartment. The bars are arranged longitudinally (i.e. parallel to the advancement direction of the motor vehicle) and are located close to the edges of the roof adjacent to the doors, respectively.

Although the longitudinal bars allow one or more packages to be secured to the motor vehicle (for example by means of *ropes), the friction between the packages and the air while the vehicle is moving, as well as the accelerations and decelerations of the latter, tend to cause the packages to slide onto the glass or back window of the motor vehicle. Obviously this is a problem since if a package slides from the roof of the vehicle when it is moving, the visibility from inside the passenger compartment is reduced and the stability of the motor vehicle is compromised. In light of what is said, it is apparent that a luggage boot in itself does not allow safely transporting one or more packages on the roof of a motor vehicle.

To obviate this drawback and prepare a luggage boot to safely transport one or more packages, rods have been conceived which are connectable transversely, at the ends thereof, to the pair of longitudinal bars of the luggage boots. Said rods oppose the sliding of the packages from the roof of the motor vehicle when they are connected to a luggage boot, in virtue of the transversality thereof.

When the vehicle on which they are mounted is moving and the luggage boot is not used, the cross rods increase the friction between the air and the motor vehicle, and generate whistling which causes discomfort to the people in the passenger compartment. If the luggage boot is not being used, the presence of the aforesaid cross rods therefore is inconvenient. For this reason, the connection between the cross rods and a luggage boot generally is of the "reversible" type, i.e. it is such a connection whereby the cross rods are connectable and disconnectable to/from the luggage boot an indefinite number of times. Said reversible connection preferably is obtained by fastening a pair of vices which can be firmly tightened on the longitudinal bars of the luggage boot, to the ends of each cross rod.

When a luggage boot is not being used, the cross rods may be disconnected therefrom due to the aforesaid vices. However, this means that each time one or more packages are to be transported on the roof of a motor vehicle, the cross rods are to be connected to the luggage boot before placing the packages on the roof, and they are to be disconnected from the luggage boot after the packages have been removed from the roof (i.e. after use of the luggage boot is finished). What is said obviously is a disadvantage since the mounting and dismounting operations of the cross rods are not easy and result in a significant waste of time.

OBJECTS OF THE INVENTION

It is an object of the present invention to overcome the aforesaid drawbacks by indicating a device connectable to the luggage boot of a motor vehicle so that the latter is quickly and easily ready to safely transport one or more packages, especially by providing means suitable for preventing a sliding of the packages from the roof of the motor vehicle onto the glass or dashboard thereof.

SUMMARY OF THE INVENTION

The object of the present invention is a device connectable to a first and a 10 second bar of a luggage boot of a motor vehicle, said device comprising:
  a first support structure;
  first connection means suitable for integrally connecting the first support structure to the first bar of the luggage boot;
  a first element extending lengthwise comprising a first end and a second end opposite to the first end, said first element indicated later in the present description with the expression "first longitudinal element";
  second connection means between the first end of the first longitudinal element and the first support structure, the second connection means being suitable for allowing a rotation of said first longitudinal element with respect to the first support structure, between at least:
    a first position (at which, when the device the object of the invention is connected to the luggage boot, the first longitudinal element is arranged substantially parallel to the first bar of the luggage boot), and
    a second position at which the first longitudinal element is arranged transversely to how it is arranged in the first position (i.e. at which, when the device the object of the invention is connected to the luggage boot, the first longitudinal element is arranged transversely to the first bar of the luggage boot);
  first reversible locking means of the first longitudinal element with respect to the first support structure when the latter is in the first or in the second position.

Incidentally, similarly to what is said in reference to a reversible connection, the expression "reversible locking" means that the first longitudinal element can be locked in the first or in the second position and released therefrom an indefinite number of times.

The device the object of the invention is connected to the luggage boot of a motor vehicle by means of first connection means in such a manner whereby when the first longitudinal element is in the first position, said element is arranged substantially parallel to the first bar of the luggage boot, and when it is in the second position, said element is arranged transversely to the first bar of the luggage boot.

When the luggage boot is not used, the first longitudinal element is caused to rotate into the first position and the first locking means are actuated so that the first longitudinal element is locked in said position. Due to this, when the motor vehicle is moving, the first longitudinal element only minimally increases the friction between the air and the vehicle and does not generate any whistling.

When there is a need to use the luggage boot, to prepare the latter to safely transport one or more packages, the following operations are simply to be performed:
a) actuate the first locking means so as to release the first longitudinal element from the first position;
b) cause the first longitudinal element to rotate so as to position the latter in the second position;
c) actuate the first locking means so as to lock the first longitudinal element in the second position.

The first longitudinal element opposes a sliding of the packages from the roof of the motor vehicle when it is in the second position, in virtue of the transversality thereof.

Advantageously, unlike known cross rods mentioned above, the device the object of the invention is not to be repeatedly mounted and dismounted to/from a luggage boot. When needed, it is sufficient to rotate the first longitudinal element from the first into the second position.

Other innovative features of the present invention are illustrated in the following description and are referred to in the dependent claims.

According to one aspect of the invention, the first locking means comprise:
a second support structure;
third connection means suitable for integrally connecting the second support structure to the first bar of the luggage boot;
a third support structure;
fourth connection means suitable for integrally connecting the third support structure to the second bar of the luggage boot;
fifth connection means suitable for reversibly connecting the first longitudinal element:
to the second support structure when the first longitudinal element is in the first position;
and
to the third support structure when the first longitudinal element is in the second position;
a connection between the first longitudinal element and the second or the third support structure by means of the fifth connection means being such as to prevent a related rotation between the first longitudinal element and the first support structure when the first, the second and the third support structure are connected to the first and to the second bar of the luggage boot.

According to this aspect of the invention, to integrally connect the device the object of the invention to the luggage boot of a motor vehicle, simply:
connect the first and the second support structure to the first longitudinal bar of the luggage boot by means of first and third connection means respectively, in such a manner whereby when the first longitudinal element is in the first position, said element is arranged substantially parallel to the first bar of the luggage boot
and
connect the third support structure to the second longitudinal bar of the luggage boot by means of fourth connection means in such a manner whereby when the first longitudinal element is in the second position, said element is arranged substantially transversely to the first bar of the luggage boot.

According to one aspect of the invention, the first connection means act themselves as first support structure so as to coincide with the latter, in addition or alternatively to this, when present the third connection means themselves act as said second support structure so as to coincide with the latter, in addition or alternatively to this, when present the fourth connection means themselves act as said third support structure so as to coincide with the latter.

Advantageously, according to this aspect, there is a smaller number of components of the device the object of the invention.

According to another aspect of the invention, the first support structure is integrally connected to the second support structure, the first connection means coinciding with the third connection means.

According to this aspect of the invention, the second support structure is in a fixed position with respect to the first support structure, regardless of the fact that the device the object of the invention is or is not connected to the luggage boot of a motor vehicle. Advantageously, after connecting the first support structure to the first longitudinal bar of a luggage boot, the second support structure, which is integrally connected to the first support structure, is already in the correct position with respect to the latter.

According to another aspect of the invention, the fifth connection means comprise:
a lockbolt movable in a first seat made in the first longitudinal element at the second end thereof;
a second seat made in the second support structure and in which the lockbolt can at least partly be accommodated when the first longitudinal element is in the first position,
an at least partial housing of the lockbolt in the second seat preventing a rotation of the first longitudinal element with respect to the first support structure;
a third seat made in the third support structure and in which the lockbolt can be at least partly accommodated when the first longitudinal element is in the second position,
an at least partial housing of the lockbolt in the third seat preventing a rotation of the first longitudinal element with respect to the first support structure;
movement means of said lockbolt in said first seat, between at least:
a first disengaged position at which the lockbolt is not accommodated in the second seat nor in the third seat so as to allow a rotation of the first longitudinal element with respect to the first support structure, and
a second engaged position, at which:
when the first longitudinal element is in the first position, the lockbolt is partly accommodated in the second seat
and
when the first longitudinal element is in the second position, the lockbolt is partly accommodated in the third seat.

Advantageously, according to this aspect of the invention, the first longitudinal element may be locked in the first or in the second position by means of one lockbolt alone accommodated in the first longitudinal element.

According to another aspect of the invention, the device comprises:
a fourth support structure;
sixth connection means suitable for integrally connecting the fourth support structure to the second bar of the luggage boot;
a second element extending lengthwise comprising a first end and a second end opposite to the first end, said second element indicated later in the present description with the expression "second longitudinal element";

seventh connection means between the first end of the second longitudinal element and the fourth support structure, the seventh connection means being suitable for allowing a rotation of said second longitudinal element with respect to the fourth support structure, between at least:
- a first position at which the second longitudinal element is arranged substantially parallel to the first longitudinal element when also the latter is in the first position (i.e. at which, when the device the object of the invention is connected to the luggage boot, the second longitudinal element is arranged substantially parallel to the second bar of the luggage boot)

and
- a second position at which the second longitudinal element is arranged transversely to how it is arranged in the first position (i.e. at which, when the device the object of the invention is connected to the luggage boot, the second longitudinal element is arranged transversely to the second bar of the luggage boot);

second reversible locking means of the second longitudinal element when the latter is in the first or in the second position, the second locking means comprising eighth connection means suitable for reversibly connecting the second longitudinal element:
- to the third support structure when the second longitudinal element is in the first position and
- to the second support structure when the second longitudinal element is in the second position, a connection between the second longitudinal element and the second or the third support structure by means of the eighth connection means being such as to prevent a related rotation between the second longitudinal element and the fourth support structure when the second, the third and the fourth support structure are connected to the first and second bar of the luggage boot.

According to this aspect of the invention, advantageously the device comprises two longitudinal elements with only four support structures (rather than six).

The device the object of the invention is connected to the luggage boot of a motor vehicle by means of first, third, fourth and sixth connection means in such a manner whereby when the first and the second longitudinal element are in the first position, said elements are arranged substantially parallel to the bars of the luggage boot, and when they are in the second position, said elements are arranged transversely to the bars of the luggage boot.

According to this aspect of the invention, after connecting the device to the luggage boot of a motor vehicle, when the luggage boot is not used, the first and the second longitudinal element are caused to rotate into the first position and the first and second locking means are actuated so that the first and second longitudinal element are locked in said position. Due to this, when the motor vehicle is moving, the first and the second longitudinal element only minimally increase the friction between the air and the vehicle and do not generate any whistling.

When there is a need to use the luggage boot, to prepare the latter to safely transport one or more packages, the following operations are simply to be performed:
a) actuate the first and the second locking means so as to release the first and the second longitudinal element from the first position;
b) cause the first and the second longitudinal element to rotate so as to position the latter in the second position;
c) actuate the first and the second locking means so as to lock the first and the second longitudinal element in the second position.

The first and the second longitudinal elements oppose a sliding of the packages from the roof of the motor vehicle when they are in the second position, in virtue of the transversality thereof.

According to another aspect of the invention, the sixth connection means act themselves as fourth support structure so as to coincide with the latter.

Advantageously, according to this aspect of the invention, there is a smaller number of components of the device the object of the invention.

According to another aspect of the invention, the third support structure is integrally connected to the fourth support structure, the fourth connection means coinciding with the sixth connection means.

According to this aspect of the invention, the fourth support structure is in a fixed position with respect to the third support structure, regardless of the fact that the device the object of the invention is or is not connected to the luggage boot of a motor vehicle. Advantageously, after connecting the fourth support structure to the second longitudinal bar of a luggage boot, the third support structure, which is integrally connected to the fourth support structure, is already in the correct position with respect to the latter.

Additionally, when the first and the second longitudinal element are in the second position and are locked therein, the device the object of the invention acts as a rigid quadrilateral, i.e. like a highly stable structure.

According to another aspect of the invention, the device comprises first means for stopping a rotation of the first longitudinal element with respect to the first support structure when the first longitudinal element is in the first or in the second position, if said second longitudinal element is present, the device further comprising second means for stopping a rotation of the second longitudinal element with respect to the fourth support structure when the second longitudinal element is in the first or in the second position.

Advantageously, according to this aspect of the invention, due to the presence of the stopping means, it is highly simple to position the first (and possibly the second) longitudinal element exactly in the first or in the second position.

According to another aspect of the invention, the device comprises control means connected to the first locking means and suitable for controlling the latter to lock the first longitudinal element in the first or in the second position, and to release the first longitudinal element from the first or from the second position, if said second longitudinal element is present, said control means also being connected to the second locking means and also being suitable for controlling the latter to lock the second longitudinal element in the first or in the second position, and to release the second longitudinal element from the first or from the second position.

Advantageously, the control means may be located in the passenger compartment of the motor vehicle on which the device the object of the invention is installed. Thereby, a driver or a passenger may control the locking or the releasing of the first (and possibly the second) longitudinal element without being required to get out of the motor vehicle.

Another object of the invention is a luggage boot which is connectable to the roof of a motor vehicle, said luggage boot comprising:

a first and a second bar connectable to the roof of the motor vehicle so as to be arranged substantially parallel to each other, in which, according to the invention, the luggage boot further comprises:
at least one element extending lengthwise comprising a first end and a second end opposite to the first end;
connection means between the first end of the element extending lengthwise and the first bar, the connection means being suitable for allowing a rotation of the element extending lengthwise with respect to the first bar, between at least:
a first position at which the element extending lengthwise is arranged substantially parallel to the first bar and
a second position at which the element extending lengthwise is arranged transversely to the first bar;
reversible locking means of the element extending lengthwise when the latter is in the first or in the second position.

Another object of the invention is a motor vehicle provided with the aforesaid luggage boot, which is also the object of the invention.

BRIEF DESCRIPTION OF THE DRAWINGS

Further objects and advantages of the present invention will become apparent from the detailed description provided below of example embodiments thereof and from the accompanying drawings merely given by way of a non-limiting example, in which:

FIG. 2 shows a front plan view of the first component of the device in FIG. 1;

FIG. 3 shows a side plan view of the component in FIG. 2;

FIG. 4 shows a top plan view of the device in FIG. 1, in a configuration in which the two aforesaid components of the device are connected to each other;

FIG. 8 shows a front plan view of the first component of the device in FIG. 7;

FIG. 9 shows a side plan view of the component in FIG. 8;

DETAILED DESCRIPTION OF SOME PREFERRED EMBODIMENTS OF THE INVENTION

In the continuation of the present description, a figure may also be shown with reference to elements not expressly indicated in that figure but in other figures.

The scale and proportions of the different elements depicted do not necessarily correspond to the actual ones.

Figure 1:
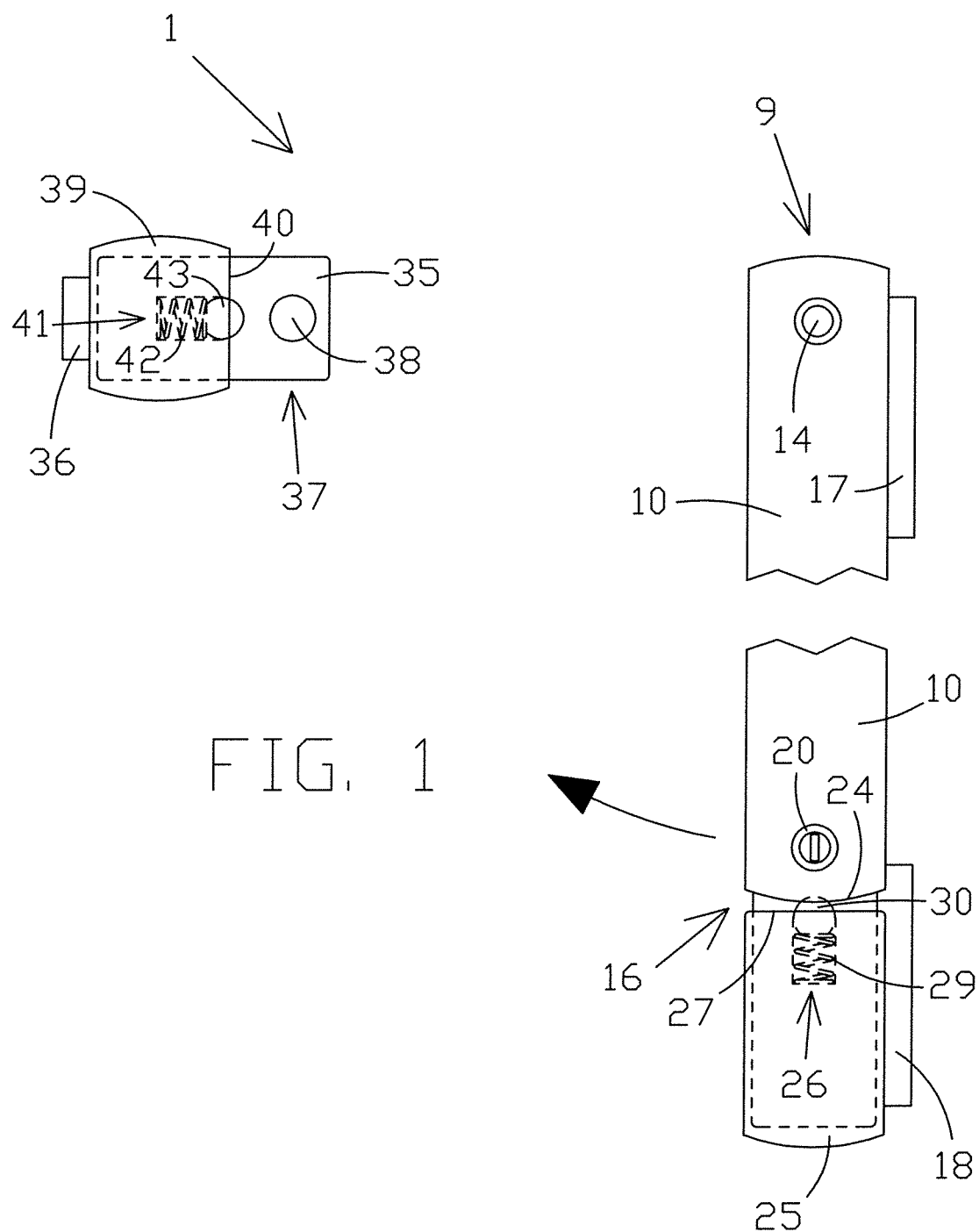
FIG. 1 shows a top plan view of a device according to the present invention in a configuration in which a first component of said device is disconnected from a second component thereof.

FIGS. 1 to 3 show a device 1 of the invention, which is connectable to bars 2 and 3 (shown in FIG. 5) of the luggage boot 4 of a motor vehicle 5 in order to make of the luggage boot 4 quickly and easily ready to safely transport one or more packages. Device 1 comprises a pair of rods 10 and 11 (i.e. elements extending lengthwise), which are preferably metal and are hinged to each other at a first end 9 and 12 thereof. The rods 10 and 11 preferably are flat, i.e. they have two dimensions almost prevailing over a third one. By way of example, rod 10 has a rectangular cross section with the short sides arched and convex outwardly. Rod 11 has a cross section, it also preferably rectangular but shorter than the cross section of rod 10. In the configuration shown in FIGS. 1 to 3, the rods 10 and 11 preferably are mutually parallel, and more preferably overlap each other. Namely, the rods 10 and 11 preferably are in contact with each other at a respective long side 13 of the cross sections thereof. Rod 10 was indicated above with the expression "first longitudinal element". As mentioned above, the rods 10 and 11 are connected to each other at a respective end 9 and 12 by means of a hinge 14. Said connection ensures that the rods 10 and 11 are rotatable with respect to each other about an axis preferably arranged orthogonal thereto, and more preferably arranged orthogonal to the long sides 13 of the cross sections of the rods 10 and 11 (i.e. arranged orthogonal to the plane of the sheet in FIG. 1). As shown in FIG. 2, rod 11 preferably is slightly longer than rod 10, and the rods 10 and 11 preferably overlap each other almost from said ends 9 and 12. Due to this, a short end portion 15 of rod 11 (opposite to end 12) projects longitudinally beyond the second end 16 of rod 10 (opposite to end 9).

Rod 11 is integrally connected to a pair of vices 17 and 18 which can be firmly tightened on bar 3 of the luggage boot 4 so as to integrally connect rod 11 to bar 3. As shown in FIG. 3, the vices 17 and 18 preferably are connected to rod 11 on the side opposite to the latter with respect to rod 10, preferably close to the ends 12 and 15. Rod 11 therefore preferably is interposed between rod 10 and vices 17 and 18. Alternatively to what is said, the vices 17 and 18 could be connected to rod 11 laterally, i.e. at one of the short sides of the cross section of rod 11. By way of example, the vices 17 and 18 are of the same type as the vices by means of which the cross rods of the prior art are connectable to the longitudinal bars of a luggage boot. Therefore, further details will not be provided. The vices 17 and 18 form only a preferred embodiment of means by which rod 11 is integrally connectable to bar 3. Said connection for example, is achievable also by screwing or bolting rod 11 to bar 3. Since rod 10 is connectable to bar 3 of the luggage boot 4 by means of rod 11, the latter can be qualified as support structure for rod 10. According to one variant of device 1 not shown in the drawings, the latter comprises only one vice 17 or 18. According to another variant of device 1 not shown in the drawings, the vices 17 and 18 (or more generally, the means suitable for connecting rod 11 to bar 3) are an integral part of rod 11, such as to be one with the latter.

Rod 10 is provided with a lock 20 by means of which it is integrally and reversibly connectable to rod 11. Lock 20 preferably is located at the end 16 of rod 10 and comprises, by way of example, a lockbolt preferably arranged transversely to rod 10, and more preferably arranged orthogonally to the long sides 13 of a cross section thereof (i.e. orthogonally to the plane of the sheet in FIG. 1). Namely, the lockbolt is movable in a first elongated seat made in rod 10, preferably at end 16 thereof. Said first seat, like the lockbolt at least partly accommodated therein, preferably is arranged transversely to rod 10, and more preferably orthogonally to the long sides 13 of a cross section thereof. In the configuration shown in FIGS. 1 to 3, the aforesaid first seat is aligned with a second seat 21 made in rod 11 close to portion 15, and in which the lockbolt can be at least partly accommodated. Lock 20 comprises known means by which the lockbolt translates in the aforesaid first seat between a first disengaged position, at which the lockbolt is not accommodated in seat 21, and a second engaged position, at which the lockbolt is at least partly accommodated in seat 21. When the lockbolt is in the disengaged position, rod is rotatable with respect to rod 11 by means of hinge 14. When the lockbolt is in the engaged position, it creates a restraint which prevents a related rotation between the rods 10 and 11 such as to integrally connect them to each other. The lock 20 of rod 10 and seat 21 in rod 11 therefore act as reversible locking means of rod 10 with respect to rod 11 in the configuration shown in FIGS. 1 to 3. The movement means of the lockbolt preferably can be actuated by means of a key which can be inserted into lock 20 transversely to rod 10.

Device 1 comprises a block 25 integrally connected to rod 11 at the end portion 15, on the side opposite to the latter with respect to vice 18. Block 25 preferably is elongated in shape and preferably is connected to rod 11 parallel to the latter. Block 25 has such a longitudinal extension as not to occlude seat 21. Block 25 is also connected to rod 11 preferably in such a manner whereby, in the configuration shown in FIGS. 1 to 3, it is aligned with rod 10. A transverse wall 27 of block 25 therefore is opposed to a transverse wall 24 of rod 10 arranged at end 16 of the latter. Block 25 includes a hole 26 which extends longitudinally from wall 27 and acts as seat for accommodating a spring 28, preferably of the helical type. The latter is compressed between a bottom wall 29 of hole 26 and a sphere 30, it also partly accommodated in hole 26 at wall 27 (opposite to the bottom wall 29). Namely, hole 26 is partly flared at wall 27 and has such a shape whereby sphere 30, pushed by spring 28, partly projects outside block 25 but is held in hole 26 by the flaring thereof (as shown in FIGS. 1 and 3). When a thrust of such an entity as to overcome the elastic force of spring 28 is applied to sphere 30, sphere 30 penetrates hole 26. When there is no longer such a trust, spring 28 sends sphere 30 to abut against the flaring of hole 26 again, so as to partly project from wall 27, outside block 25.

Rod 10 comprises a recess 31 at wall 24, where in the configuration shown in FIGS. 1 to 3, sphere 30 is partly accommodated at the portion thereof which lies outside hole 26. Excluding recess 31, when the rods 10 and 11 are in the aforesaid configuration, sphere 30 projects from wall 27 more than the distance between the latter and the wall 24 of rod 10. Recess 31 is made in wall 24 in such a position whereby, when sphere 30 is partly accommodated therein, the aforesaid first seat of lock 20 is aligned with seat 21 so that the lockbolt can translate in the engaged position. Spring 28, sphere 30 and recess 31 therefore act as means which, during a rotation of rod 10 with respect to rod 11, advantageously stop said rotation when the rods 10 and 11 are in the configuration shown in FIGS. 1 to 3. Namely, when the rods 10 and 11 are not parallel to each other, sphere 30 projects outside block 25 but it is not partly accommodated in recess 31. By causing rod 10 to rotate with respect to rod 11 so as to overlap each other (in the configuration shown in FIGS. 1 to 3), wall 24 initially presses sphere 30 inside hole 26. Continuing with the rotation, sphere 30 "snaps" into recess 31 when the aforesaid first seat of lock 20 is aligned with seat 21.

Spring 28, sphere 30 and recess 31 are only a preferred embodiment of means by which a rotation of rod 10 with respect to rod 11 can be stopped when the rods 10 and 11 are in the configuration shown in FIGS. 1 to 3. Said stop for example is achieved by means of a stop against which rod 10 abuts when it is in the aforesaid configuration.

According to one variant of device 1, rather than extending from the end 9 of rod 10 to block 25, rod 11 is divided into two portions. Namely, a first rod portion 11 (indicated above with the expression "first support structure" and indicated in FIG. 3 by numeral 11a) is connected to hinge 14 and to vice 17. A second rod portion (indicated above with the expression "second support structure" and indicated in FIG. 3 by numeral 11b) is connected to block 25 and to vice 18, and includes seat 21. According to this variant of device 1, the vices 17 and 18 act as means suitable for connecting the two aforesaid portions 11a and 11b to bar 3 of the luggage boot 4 respectively. In addition, rod 10 is connectable by means of lock 20 to the aforesaid second portion 11b (when the device the object of the invention is in a configuration corresponding to the one shown in FIGS. 1 to 3). The presence of a rod 11 which extends from the end 9 of rod 10 to block 25 is the same as the presence of the portions 11a and 11b if the latter are integrally connected to each other. In light of this, similarly to what is said above, if the portions 11a and 11b are integrally connected to each other, the device the object of the invention could comprise one vice 17 or 18 alone. The latter could also be integral parts of the aforesaid first and second portion 11a and 11b respectively, so as to be one therewith.

As shown in FIG. 1, device 1 also comprises a short plate 35 integrally connected to a vice 36 which can be firmly tightened on bar 2 of the luggage boot 4 so as to integrally connect plate 35 to bar 2. Plate 35 was indicated above with the expression "third support structure". Vice 36 preferably is connected to plate 35 at a long side of a cross section of the latter. Alternatively, vice 36 could be laterally connected to plate 35, i.e. at a short side of the aforesaid cross section. Vice 36 preferably is of the same type as the vices 17 and 18. Like the latter, vice 36 is only a preferred embodiment of means by which plate 35 is integrally connectable to bar 2. Said connection is for example, achievable also by screwing plate 35 to bar 2. According to a variant of device 1 not shown in the drawings, vice 36 (or more generally, the means suitable for connecting plate 35 to bar 2) is an integral part of plate 35 such as to be one with the latter.

Plate 35 extends transversely to vice 36 so as to form a kind of shelf 37 where a seat 38 is made (indicated above with the expression "third seat") in which the lockbolt of lock 20 can be at least partly accommodated.

FIG. 4 shows device 1 with rod 10 rotated by 90° with respect to the configuration shown in FIGS. 1 to 3. Rod 10 therefore preferably is arranged orthogonally to rod 11. When device 1 is in use, rod 11 and plate 35 are to be connected to the bars 3 and 2 respectively, of the luggage boot 4 in such a manner whereby, in the configuration shown in FIG. 4, rod 10 overlaps the shelf 37 of plate 35 at end 16 thereof, and namely in such a manner whereby the aforesaid first seat of lock 20 is aligned with seat 38. When the lockbolt of lock 20 is in the disengaged position, it is not accommodated in seat 38 and rod 10 is rotatable with respect to rod 11 by means of hinge 14. When instead the lockbolt is in the engaged position, it is at least partly accommodated in seat 38 so as to create a restraint which prevents a related rotation between the rods 10 and 11, thus integrally connecting them to each other. The lock 20 of rod 10 and seat 38 in plate 35 therefore act as reversible locking means of rod 10 with respect to rod 11 in the configuration shown in FIG. 4.

In light of what is said, rod 10 is rotatable with respect to rod 11 by means of hinge 14, between a first position shown in FIGS. 1 to 3, at which the rods 10 and 11 are parallel to each other, and a second position shown in FIG. 4, at which rod 10 preferably is arranged transversely to rod 11, i.e. transversely to how rod 10 is arranged in the first position. Lock 20 and the seats 21 and 38 act as reversible locking means of rod 10 with respect to rod 11 in the aforesaid first and second position.

A block 39 is integrally connected to rod 11 on the side opposite to the latter with respect to vice 36. Block 39 is connected to plate 35 so as not to occlude seat 38. Block 39 is also connected to plate 35 preferably in such a manner whereby, in the configuration shown in FIG. 4, it is aligned with rod 10. In said configuration, a transverse wall 40 of block 39 therefore is opposed to the transverse wall 24 of rod 10. Like block 25, block 39 includes a hole 41 which extends longitudinally (i.e. parallel to rod 10 in the configuration shown in FIG. 4) from wall 40 and acts as seat for accommodating a spring 42, preferably of the helical type. The latter is compressed between a bottom wall of hole 41 and a sphere 43, it also partly accommodated in hole 41 at wall 40. Namely, like hole 26, hole 41 is partly flared at wall 40 and has such a shape whereby sphere 43, pushed by spring 42, partly projects outside block 39 but is held in hole 41 by the flaring thereof (as shown in FIG. 4). When a thrust of such an entity as to overcome the elastic force of spring 42 is applied to sphere 43, sphere 43 penetrates hole 41. When there is no longer such a trust, spring 42 sends sphere 43 to abut against the flaring of hole 41 again, so as to partly project from wall 40, outside block 39.

Sphere 43 can be partly accommodated in recess 31 made in the wall 24 of rod 10. Said partial housing takes place when rod 10 is in the configuration shown in FIG. 4. Excluding recess 31, when rod 10 is in the aforesaid configuration, sphere 43 projects from wall 40 more than the distance between the latter and the wall 24 of rod 10. Seat 38 in shelf 37 is in such a position whereby, when sphere 43 is partly accommodated in recess 31, the aforesaid first seat of lock 20 is aligned with seat 38 so that the lockbolt can translate in the engaged position. Spring 42, sphere 43 and recess 31 therefore act as means which, during a rotation of rod 10 with respect to rod 11, advantageously stop said rotation when the rods 10 and 11 are in the configuration shown in FIG. 4. Namely, when the rods 10 and 11 are not arranged transversely to each other, sphere 43 projects outside block 39, but it is not partly accommodated in recess 31. By causing rod 10 to rotate with respect to rod 11 so as to bring them into the configuration shown in FIG. 4, wall 24 initially presses sphere 43 inside hole 41. Continuing with the rotation, sphere 43 "snaps" into recess 31 when the aforesaid first seat of lock 20 is aligned with seat 38.

Similarly to what is said in reference to spring 28 and sphere 30, spring 42, sphere 43 and recess 31 are only a preferred embodiment of means by which a rotation of rod 10 with respect to rod 11 can be stopped when the rods 10 and 11 are in the configuration shown in FIG. 4. Said stop for example is achieved by means of a stop against which rod 10 abuts when it is in the aforesaid configuration.

Figure 5:
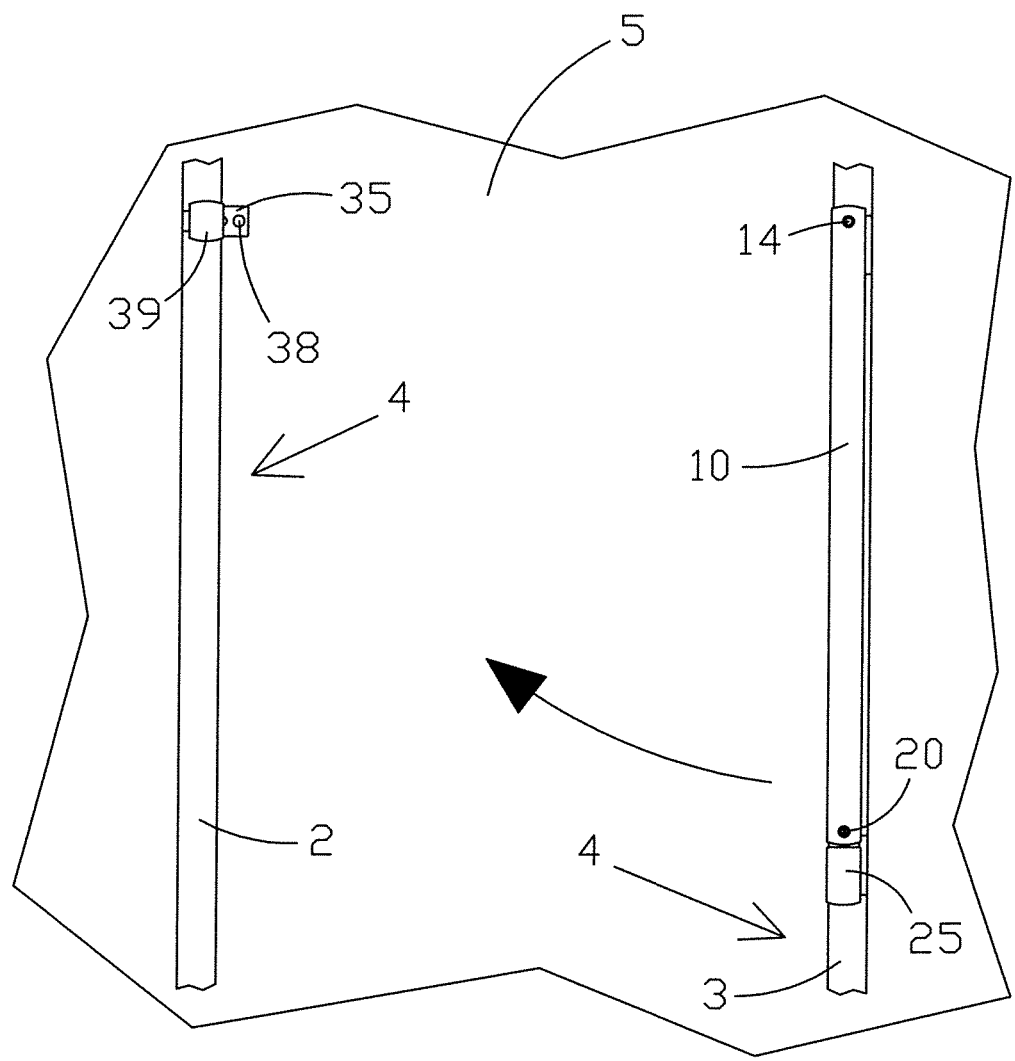
FIG. 5 shows a top plan view of the device in FIG. 1, installed on the luggage boot of a motor vehicle, in the configuration in FIG. 1.
Figure 6:
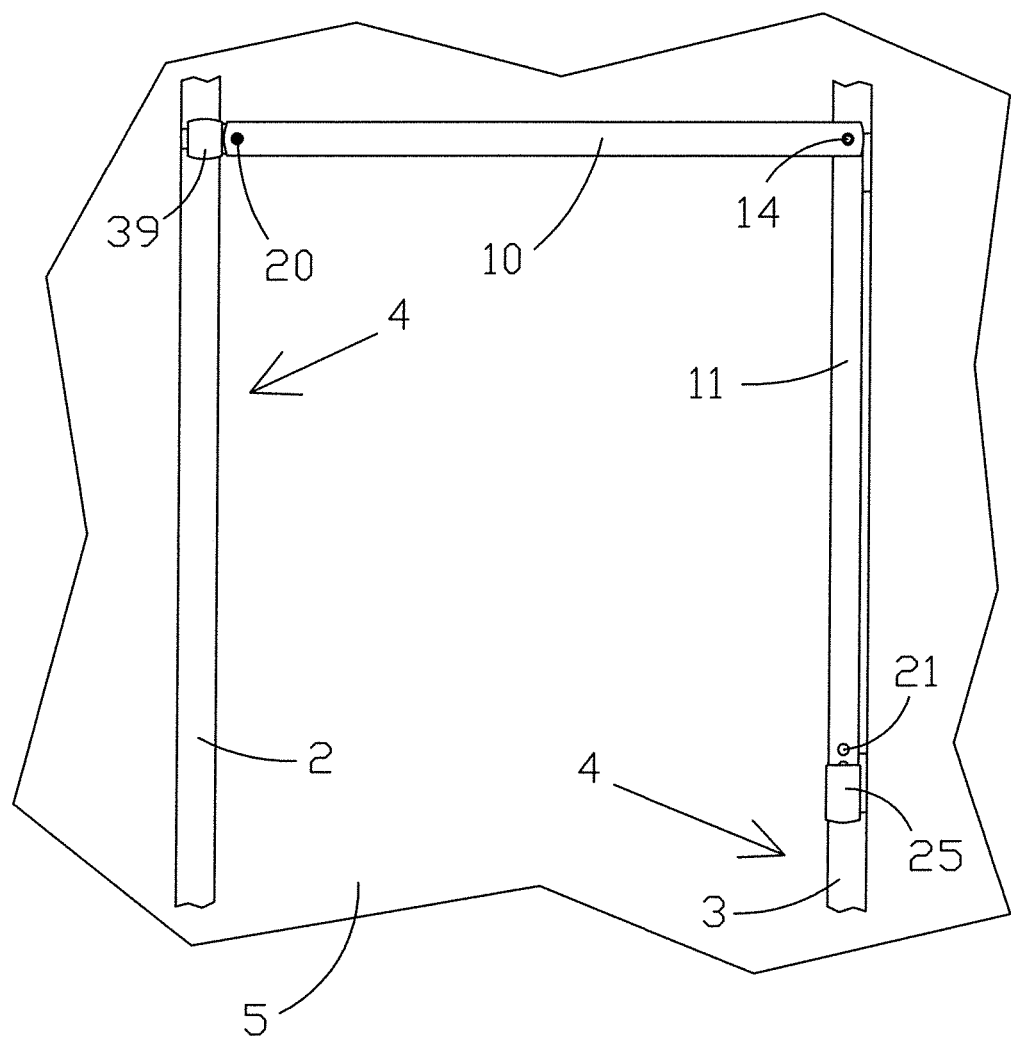
FIG. 6 shows the device in FIG. 5, in the configuration in FIG. 4.

FIGS. 5 and 6 show device 1 connected to the bars 2 and 3 of the luggage boot 4 of a motor vehicle 5 (of which only part of the roof is shown in FIGS. 5 and 6). Namely, rod 11 is connected to bar 3, preferably parallel thereto, by means of the vices 17 and 18. Plate 35 is connected to bar 2 by means of vice 36. In FIG. 5, device 1 is in the configuration shown in FIGS. 1 to 3. In this configuration, rod 10 is arranged substantially parallel to the bars 2 and 3. In FIG. 6, device 1 is in the configuration shown in FIG. 4. In this configuration, rod 10 is arranged substantially transversely to the bars 2 and 3. After connecting rod 11 to bar 3, plate 35 is to be connected to bar 2 in a suitable position, i.e. so that the aforesaid first seat of lock 20 is aligned with the seat 38 of shelf 37 when rod 10 is arranged substantially transversely to the bars 2 and 3.

When the luggage boot 4 is not in use, rod 10 preferably is arranged parallel to the bars 2 and 3 and is locked in this position by means of lock 20 (with the lockbolt in the engaged position).

When there is a need to use the luggage boot 4, to prepare the latter to safely transport one or more packages, the following operations are simply to be performed:
a) actuate lock 20 so as to release rod 10;
b) cause rod 10 to rotate so that the latter is overlapping shelf 37 at end 16 thereof (i.e. so that rod 10 is arranged transversely to the bars 2 and 3 of the luggage boot 4);
c) actuate lock 20 so as to lock rod 10.

As Illustrated above, spring 41, sphere 43 and recess 31 facilitate the correct positioning of rod 10 with respect to plate 35 so that the lockbolt of lock 20 can at least partly translate in seat 38.

Incidentally, to bring device 1 into the configuration shown in FIG. 5, it is necessary to simply perform the following operations:
a) actuate lock 20 so as to release rod 10;
b) cause rod 10 to rotate so that the latter is overlapping rod 11 (i.e. so that rod 10 is arranged parallel to the bars 2 and 3 of the luggage boot 4);
c) actuate lock 20 so as to lock rod 10.

As Illustrated above, spring 28, sphere 30 and recess 31 facilitate the correct positioning of rod 10 with respect to rod 11 so that the lockbolt of lock 20 can at least partly translate in seat 21.

Incidentally, as is apparent from that shown in FIGS. 4 and 6, rod 10 is to be long enough so it can overlap shelf 37 when rod 11 and plate 35 are connected to the bars 3, 2 respectively, of the luggage boot 4 and device 1 is in the configuration shown in FIGS. 4 and 6.

Figure 7:
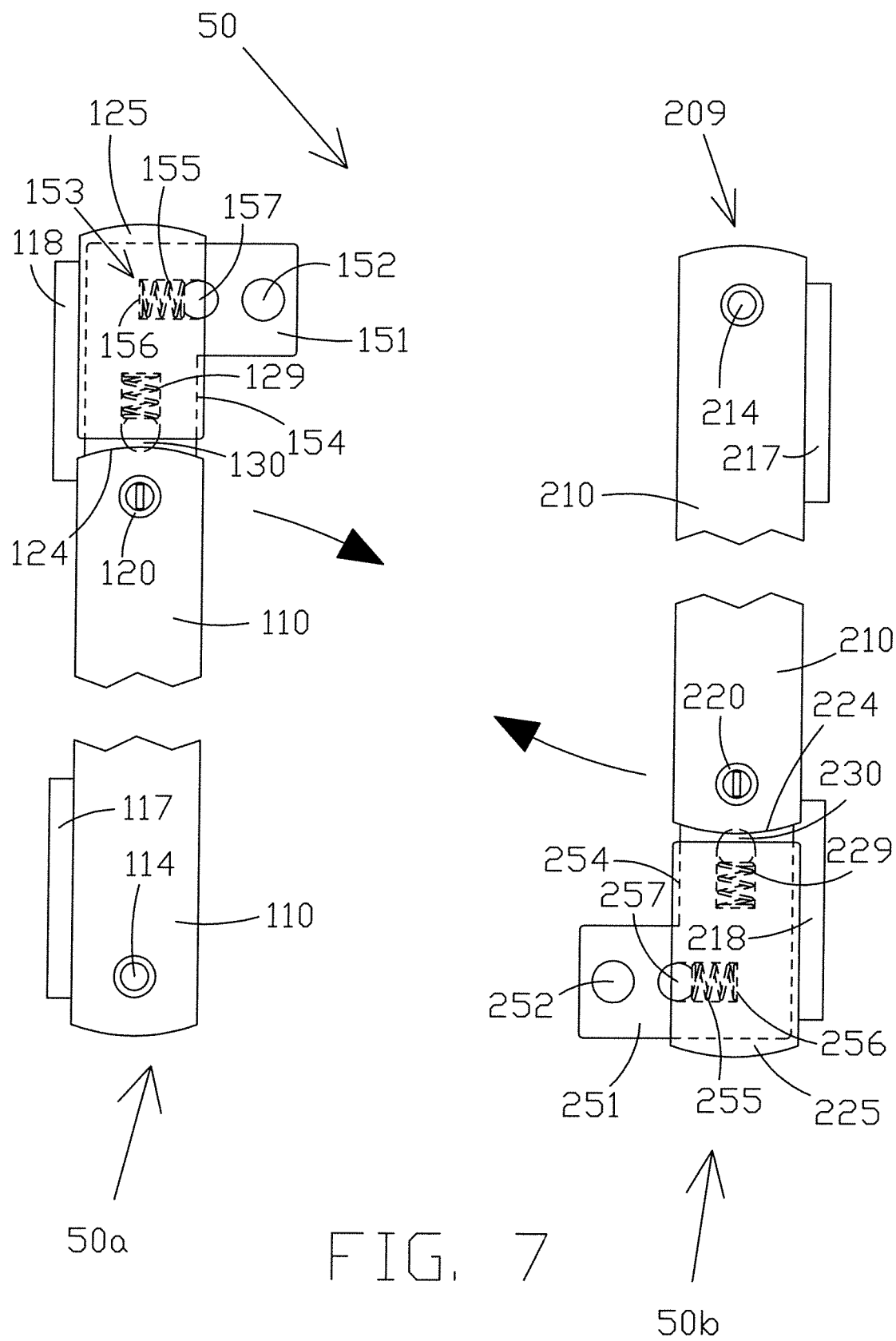
FIG. 7 shows a top plan view of a variant of the device in FIG. 1 in a configuration in which a first component of said device according to said variant is disconnected from a second component thereof.

FIGS. 7 to 9 show a device 50 which constitutes a variant of device 1 shown in the preceding drawings. Device 50 differs from device 1 in that it comprises two components 50a and 50b, which preferably are identical to each other, and each of which being obtained by integrating plate 35 in rod 11 and block 39 in block 25.

For increased clarity, in order to distinguish the elements of the component 50a of device 50 from the corresponding elements of component 50b in FIGS. 7 to 12 and in the appended claims:

single-digit numerals identifying the elements of component 50a are preceded by the number "10" and single-digit numerals identifying the elements of component 50b are preceded by the number "20". By way of example, the end 9 of the rod 10 of component 50a is identified by number 109, the end 9 of the rod 10 of component 50b is identified by number 209;

two-digit numerals identifying the elements of component 50a are preceded by the number "1" and two-digit numerals identifying the elements of component 50b are preceded by the number "2". By way of example, the rod 10 of component 50a is identified by number 110, the rod 10 of component 50b is identified by number 210.

Component 50*a* or 50*b* differs from device 1 in that rod 11 transversely projects at end 12 to form a shelf 51 where a seat 52 is obtained in which the lockbolt of lock 20 of the other component 50*b* or 50*a* can be at least partly accommodated. Seat 52 is made at the same face of rod 51 where seat 21 is made. As mentioned above, plate 35 is integrated transversely in rod 11. This means that shelf 51 corresponds to shelf 37, seat 52 corresponds to seat 38 and vice 36 corresponds to vice 18.

Component 50*a* or 50*b* differs from device 1 also in that block 25 includes a second hole 53 which extends transversely from a side wall 54 of block 25 facing shelf 51. Hole 53 acts as seat for housing a second spring 55, which preferably is of the helical type. The latter is compressed between a bottom wall 56 of hole 53 and a second sphere 57, it also partly accommodated in hole 53 at wall 54 (opposite to the bottom wall 56). Namely, hole 53 is partly flared at wall 54 and has such a shape whereby sphere 57, pushed by spring 55, partly projects outside block 25 but is held in hole 53 by the flaring thereof (as shown in FIGS. 7 and 9). When a thrust of such an entity as to overcome the elastic force of spring 55 is applied to sphere 57, sphere 57 penetrates hole 53. When there is no longer such a trust, spring 55 sends sphere 57 to abut against the flaring of hole 53 again, so as to partly project from wall 54, outside block 25.

Sphere 43 can be partly accommodated in the recess 31 of rod 10 of the other component 50*b* or 50*a*. Seat 52 in shelf 51 is in such a position whereby, when sphere 57 is partly accommodated in the recess 31 of rod 10 of the aforesaid other component 50*b* or 50*a*, the first seat of lock 20 of the latter is aligned with seat 52 so that the lockbolt can translate in the engaged position. As mentioned above, block 39 is integrated in block 25. This means that hole 53 corresponds to hole 41, spring 55 corresponds to spring 42 and sphere 57 corresponds to sphere 43.

As shown in FIG. 7, the components 50*a* and 50*b* are rotated with respect to each other by 180° with respect to an axis arranged orthogonally to the plane of the sheet in FIG. 7.

In the configuration shown in FIGS. 7 to 9, the rods 10 of the components 50*a* and 50*b* overlap the respective rods 11, i.e. they are arranged parallel thereto. This configuration corresponds to the one of device 1 shown in FIGS. 1 to 3.

Incidentally, the above-described variants of device 1 with reference to rod 11, vices 17 and 18, and the assembly consisting of spring 28, sphere 30 and recess 31, also hold true for device 50.

In greater detail, according to one variant of device 50, rather than extending from the end 9 of rod 10 to block 25, the rods 11 are divided into two portions. With reference to component 50*b*, a first rod portion 11 (corresponding to the previously indicated "first support structure" and indicated in FIG. 9 by numeral 11*a*) is connected to hinge 14 and to vice 17. A second rod portion 11 (corresponding to the previously indicated "second support structure" and indicated in FIG. 9 by numeral 11*b*) is connected to block 25 and to vice 18, and includes seats 21 and 52. With reference to component 50*a*, a first rod portion 11 (indicated above with the expression "fourth support structure" and identical to the portion indicated in FIG. 9 by numeral 11*a*) is connected to hinge 14 and to vice 17. A second rod portion 11 (corresponding to the previously indicated "third support structure" and identical to the portion indicated in FIG. 9 by numeral 11*b*) is connected to block 25 and to vice 18, and includes seats 21 and 52. According to this variant of device 50, the vices 17 and 18 act as means suitable for connecting the aforesaid portions 11*a* and 11*b* of rod 11 to bars 2 and 3 respectively, of the luggage boot 4. In addition, rod 10 in each component 50*a* or 50*b* is connectable by means of lock 20 to the aforesaid second portion 11*b* (when the device the object of the invention is in a configuration corresponding to the one shown in FIGS. 7 to 9). The presence in each component 50*a* or 50*b* of a rod 11 which extends from the end 9 of rod 10 to block 25 is the same as the presence of the aforesaid first and second portion 11*a* and 11*b* if they are integrally connected to each other. In light of this, if the aforesaid first and second portions 11*a* and 11*b* for each component 50*a* or 50*b* are integrally connected to each other, the device the object of the invention could comprise one vice 17 or 18 alone. The latter could also be integral parts of the aforesaid first and second portion 11*a* and 11*b* respectively, so as to be one therewith.

Figure 10:
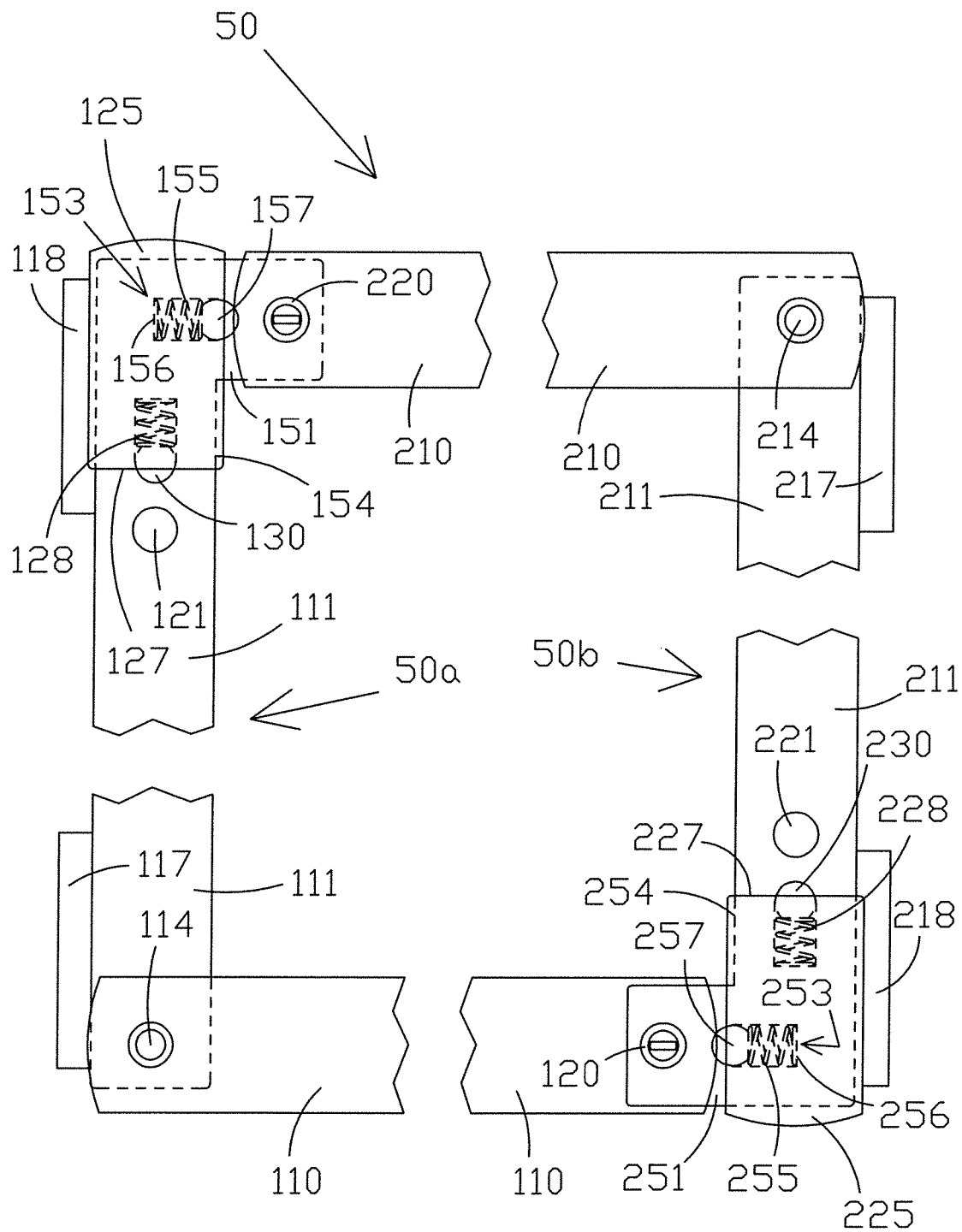
FIG. 10 shows a top plan view of the device in FIG. 7, in a configuration in which the two aforesaid components of the device are connected to each other.

FIG. 10 shows device 50 with the rods 10 rotated by 90° with respect to the configuration shown in FIGS. 7 to 9. The rods 10 therefore preferably are arranged orthogonally to the rods 11. When device 50 is in use, the components 50*a* and 50*b* are to be connected to the bars 2 and 3 respectively, of the luggage boot 4 in such a manner whereby, when device 50 is in the configuration shown in FIG. 10, rod 10 of one component 50*a* or 50*b* overlaps shelf 51 of the other component 50*b* or 50*a* at end 16 thereof, and namely in such a manner whereby the aforesaid first seat of each lock 20 is aligned with the respective seat 52. When the lockbolt of each lock 20 is in the disengaged position, it is not accommodated in the respective seat 52 and the rods 10 are rotatable with respect to the rods 11 by means of hinge 14. When instead the lockbolt is in the engaged position, it is at least partly accommodated in the respective seat 52 so as to create a restraint which prevents a related rotation between the rods 10 and 11, thus integrally connecting them to each other to form a rigid quadrilateral. The locks 20 and the seats 52 therefore act as reversible locking means of the rods 10 with respect to the rods 11 in the configuration shown in FIG. 10.

In light of what is said, the rods 10 are rotatable with respect to the rods 11 by means of the hinges 14, between a first position, shown in FIGS. 7 to 9, at which the rods 10 and 11 are parallel to each other, and a second position, shown in FIG. 10, at which the rods 10 preferably are arranged transversely to the rods 11, i.e. transversely to how the rods 10 are arranged in the first position. The locks 20 and the seats 21 and 52 act as reversible locking means of the rods 10 with respect to the rods 11 in the aforesaid first and second position.

As mentioned above, sphere 57 of each component 50*a* or 50*b* can be partly accommodated in recess 31 made in the wall 24 of rod 10 of the other component 50*b* or 50*a*. Said partial housing takes place when the rods 10 are in the configuration shown in FIG. 10. Excluding recess 31, when rod 10 in each component 50*a* or 50*b* is in the aforesaid configuration, sphere 43 projects from wall 40 more than the distance between the latter and the wall 24 of rod 10 of the other component 50*b* or 50*a*. The seats 52 in the shelves 51 are in such a position whereby, when the spheres 57 are partly accommodated in the recesses 31, the aforesaid first seat of lock 20 is aligned with the respective seat 52 so that the lockbolt can translate in the engaged position. The springs 55, the spheres 57 and the recesses 31 therefore act as means which, during a rotation of the rods 10 with respect to the rods 11, advantageously stop said rotation when the rods 10 and 11 are in the configuration shown in FIG. 10. Namely, when the rods 10 and 11 are not arranged transversely to each other, the spheres 57 project outside block 25, but they are not partly accommodated in the recesses 31.

By causing the rods 10 to rotate with respect to the rods 11 so as to bring them into the configuration shown in FIG. 10, the walls 24 initially press the spheres 57 inside the respective holes 53. Continuing with the rotation, the spheres 57 "snap" into the recesses 31 when the aforesaid first seat of each lock 20 is aligned with the respective seat 52.

Similarly to what is said in reference to the springs 28 and the spheres 30, the springs 55, the spheres 57 and the recesses 31 are only a preferred embodiment of means by which a rotation of the rods 10 with respect to the rods 11 can be stopped when the rods 10 and 11 are in the configuration shown in FIG. 10. Said stop for example is achieved by means of a pair of stops against which the rods 10 abut when they are in the aforesaid configuration.

Incidentally, with reference to the above-described variant of the device the object of the invention in which the rods 11 are divided into two portions 11a and 11b, rod 10 in each component 50a or 50b is connectable by means of lock 20 to the aforesaid second portion 11b of the other component 50b or 50a when the device the object of the invention is in a configuration corresponding to the one shown in FIG. 10.

Figure 11:
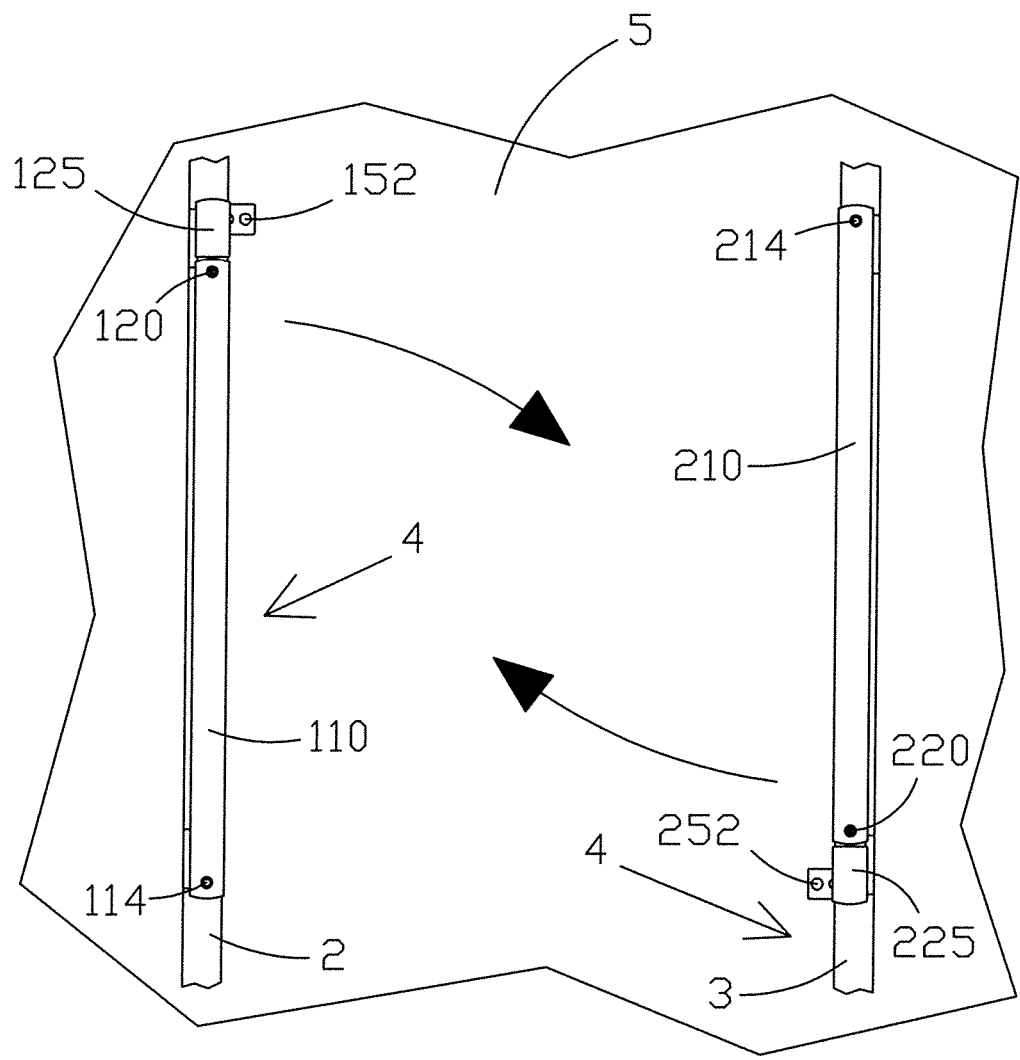
FIG. 11 shows a top plan view of the device in FIG. 7, installed on the luggage boot of a motor vehicle, in the configuration in FIG. 7.
Figure 12:
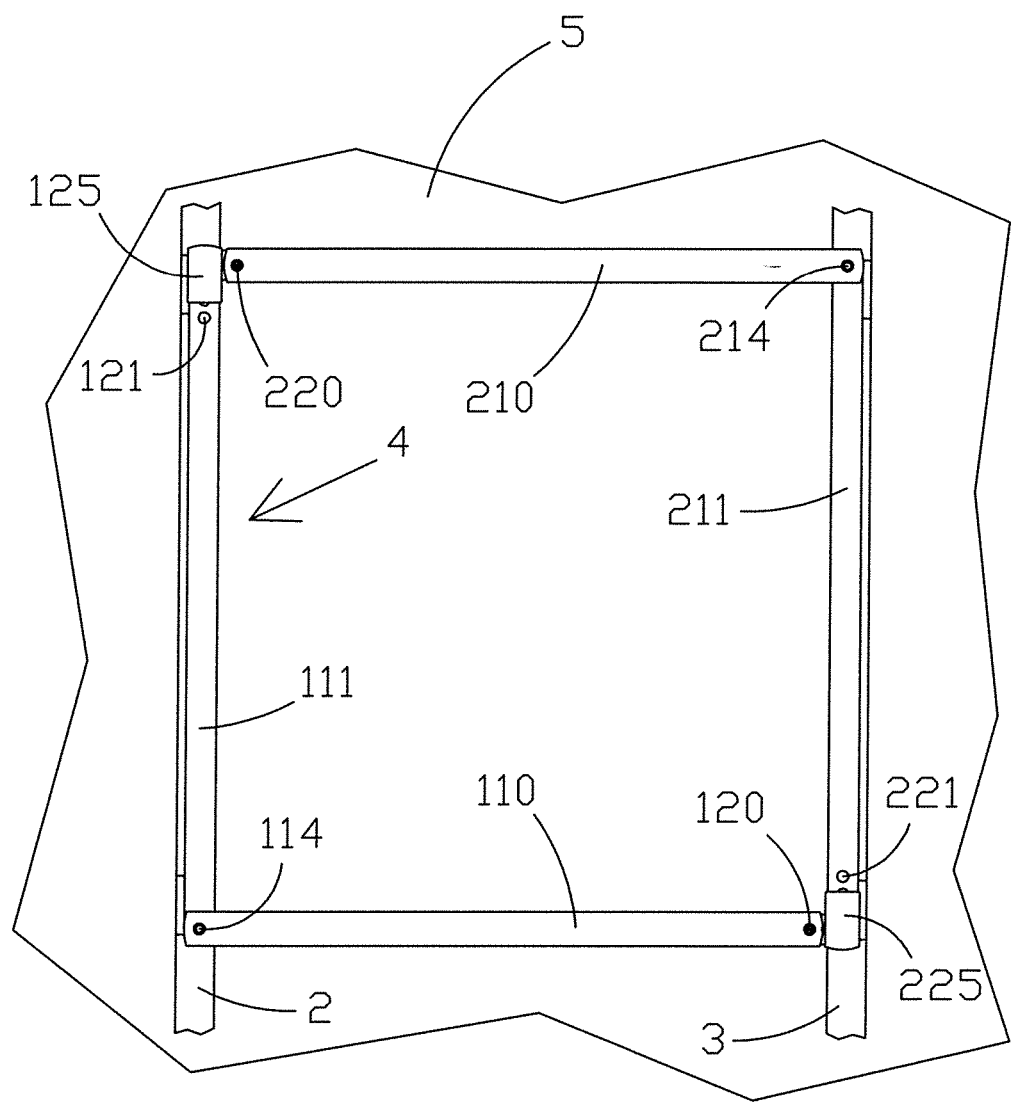
FIG. 12 shows the device in FIG. 11, in the configuration in FIG. 10.

FIGS. 11 and 12 show device 50 connected to the bars 2 and 3 of the luggage boot 4 of the motor vehicle 5 (of which only part of the roof is shown in FIGS. 11 and 12). Namely, the rod 11 of component 50a is connected to bar 2, preferably parallel thereto, and the rod 11 of component 50b is connected to bar 3, preferably parallel thereto. In FIG. 11, device 50 is in the configuration shown in FIGS. 7 to 9. In this configuration, the rods 10 are arranged substantially parallel to the bars 2 and 3. In FIG. 11, device 50 is in the configuration shown in FIG. 10. In this configuration, the rods 10 are arranged substantially transversely to the bars 2 and 3. After connecting the rod 11 of component 50a to bar 2, the rod 11 of component 50b is to be connected to bar 3 in a suitable position, i.e. so that the aforesaid first seat of each lock 20 is aligned with the respective seat 52 when the rods 10 are arranged substantially transversely to the bars 2 and 3.

When the luggage boot 4 is not in use, the rods 10 preferably are arranged parallel to the bars 2 and 3 and are locked in this position by means of the respective locks 20 (with the lockbolt in the engaged position).

When there is a need to use the luggage boot 4, to prepare the latter to safely transport one or more packages, the following operations are simply to be performed:
a) actuate the locks 20 so as to release the rods 10;
b) cause the rods 10 to rotate so that the latter overlap the respective shelves 51 at the end 16 thereof (i.e. so that the rods 10 are arranged transversely to the bars 2 and 3 of the luggage boot 4);
c) actuate the locks 20 so as to lock the rods 10.

As illustrated above, the springs 55, the spheres 57 and the recesses 31 facilitate the correct positioning of the rods 10 with respect to the shelves 51 so the lockbolt of each lock 20 can be at least partly translated in the respective seat 52.

Incidentally, to bring device 50 into the configuration shown in FIG. 11, it is necessary to simply perform the following operations:
a) actuate the locks 20 so as to release the rods 10;
b) cause the rods 10 to rotate so that the latter overlap the rods 11 respectively (i.e. so that the rods 10 are arranged parallel to the bars 2 and 3 of the luggage boot 4);
c) actuate the locks 20 so as to lock the rods 10.

The springs 28, the spheres 30 and the recesses 31 facilitate the correct positioning of the rods 10 with respect to the rods 11 so the lockbolt of each lock 20 can be at least partly translated in the respective seat 52.

Incidentally, as is apparent from that shown in FIGS. 10 and 12, the rods 10 are to be long enough so they can overlap the shelves 51 when the rods 11 are connected to the bars 2, 3 of the luggage boot 4 and device 50 is in the configuration shown in FIGS. 10 and 12.

According to one variant of device 1 or 50, the lock 30 of rod 10 (or of each rod 10) can be controlled by means of suitable means which preferably can be accommodated in the passenger compartment of the motor vehicle on which the luggage boot the device the object of the invention can be installed.

Another object of the invention is a luggage boot which is connectable to the roof of a motor vehicle 5 comprising:
a pair of bars 2 and 3 which are connectable to the roof of the motor vehicle so as to be arranged substantially parallel to each other
device 1 (or one of the variants thereof described above) without the vices 17, 18 and 36, and:
with rod 11 coinciding with one of the two aforesaid longitudinal bars 2 and 3, and
with plate 35 coinciding with the other longitudinal bar.

According to one variant of the aforesaid luggage boot the object of the invention, in place of device 1, the latter comprises device 50 (or one of the variants thereof described above) without the vices 17 and 18 and with the rods 11 coinciding with the two aforesaid longitudinal bars 2 and 3.

Another object of the invention is a motor vehicle provided with the aforesaid luggage boot the object of the invention or with the aforesaid variant thereof.

On the basis of the description provided for a preferred example embodiment, it is obvious that some changes can be made by those skilled in the art without departing from the scope of the invention as defined by the following claims.

The invention claimed is:

1. A device (50, 50a, 50b) which is connectable to a first bar (3) and to a second bar (2) of a luggage boot (4) of a motor vehicle (5),
said device (50, 50a, 50b) comprising:
a first support structure (211a);
first connection means (217) suitable for integrally connecting said first support structure (211a) to said first bar (3) of the luggage boot (4);
a first longitudinal element (210) comprising a first end (209) and a second end (216) opposite to said first end (209);
second connection means (214) between said first end (209) of said first longitudinal element (210) and said first support structure (211a), said second connection means (214) being suitable for allowing a rotation of said first longitudinal element (210), with respect to said first support structure (211a), between at least:
a first position,
and
a second position at which said first longitudinal element (210) is arranged transversely to how the first longitudinal element is arranged in said first position;
first locking means (111b, 118, 211b, 218, 220, 221, 152) suitable for reversibly locking said first longitudinal element (210) with respect to said first support structure (211a) when said first longitudinal element (210) is in said first or second position,
said first locking means comprising:
a second support structure (211b);
third connection means (218) suitable for integrally connecting said second support structure (211b) to said first bar (3) of the luggage boot (4);
a third support structure (111b);

fourth connection means (118) suitable for integrally connecting said third support structure (111b) to said second bar (2) of the luggage boot (4);
fifth connection means (220, 221, 152) suitable for reversibly connecting said first longitudinal element (210):
to said second support structure (211b) when said first longitudinal element (210) is in said first position and
to said third support structure (111b) when said first longitudinal element (210) is in said second position,
a connection between said first longitudinal element (210) and said second support structure (211b) or said third support structure (111b) by means of said fifth connection means (220, 221, 152) being such as to prevent a rotation between said first longitudinal element (210) and said first support structure (211a) when said first, second and third support structure (211a, 211b, 111b) are connected to said first and second bar (3, 2) of the luggage boot (4),
said device (50, 50a, 50b) further comprising:
a fourth support structure (111a);
sixth connection means (117) suitable for integrally connecting said fourth support structure (111a) to said second bar (2) of the luggage boot (4);
a second longitudinal element (110) comprising a first end (109) and a second end (116) opposite to said first end (110);
seventh connection means (114) between said first end (109) of said second longitudinal element (110a) and said fourth support structure (111a), said seventh connection means (114) being suitable for allowing a rotation of said second longitudinal element (110), with respect to said fourth support structure (111a), between at least:
a first position at which said second longitudinal element (110) is arranged substantially parallel to said first longitudinal element (210) when also the latter is in said first position
and
a second position at which said second longitudinal element (110) is arranged transversely to how said second longitudinal element is arranged in said first position;
second locking means (120, 121, 252) suitable for reversibly locking said second longitudinal element (110) with respect to said fourth support structure (111a) when said second longitudinal element (110) is in said first or second position, said second locking means comprising eighth connection means (120, 121, 252) suitable for reversibly connecting said second longitudinal element (110):
to said third support structure (111b) when said second longitudinal element (110) is in said first position
and
to said second support (211b) when said second longitudinal element (110) is in said second position,
a connection between said second longitudinal element (110) and said second support structure (211b) or said third support structure (111b) by means of said eighth connection means (120, 121, 252) being such as to prevent a rotation between said second longitudinal element (110) and said fourth support structure (111a) when said second, third and fourth support structure (211b, 111b, 111a) are connected to said first and second bar (3, 2) of the luggage boot (4).

2. A device according to claim 1, wherein said first connection means themselves act as said first support structure.

3. A device according to claim 2, wherein said third connection means themselves act as said second support structure.

4. A device according to claim 2, wherein said fourth connection means themselves act as said third support structure.

5. A device (50, 50a, 50b) according to claim 2, further comprising:
first means (228, 230, 231, 155, 157) for stopping a rotation of said first longitudinal element (210) with respect to said first support structure (211a) when said first longitudinal element (210) is in said first or second position;
second means (128, 130, 131, 255, 257) for stopping a rotation of said second longitudinal element (110) with respect to said fourth support structure (111a) when said second longitudinal element (110) is in said first or second position.

6. A device according to claim 1, wherein said third connection means themselves act as said second support structure.

7. A device according to claim 6, wherein said fourth connection means themselves act as said third support structure.

8. A device (50, 50a, 50b) according to claim 6, further comprising:
first means (228, 230, 231, 155, 157) for stopping a rotation of said first longitudinal element (210) with respect to said first support structure (211a) when said first longitudinal element (210) is in said first or second position;
second means (128, 130, 131, 255, 257) for stopping a rotation of said second longitudinal element (110) with respect to said fourth support structure (111a) when said second longitudinal element (110) is in said first or second position.

9. A device according to claim 1, wherein said fourth connection means themselves act as said third support structure.

10. A device (50, 50a, 50b) according to claim 9, further comprising:
first means (228, 230, 231, 155, 157) for stopping a rotation of said first longitudinal element (210) with respect to said first support structure (211a) when said first longitudinal element (210) is in said first or second position;
second means (128, 130, 131, 255, 257) for stopping a rotation of said second longitudinal element (110) with respect to said fourth support structure (111a) when said second longitudinal element (110) is in said first or second position.

11. A device according to claim 1, wherein said sixth connection means themselves act as said fourth support structure.

12. A device (50, 50a, 50b) according to claim 11, further comprising:
first means (228, 230, 231, 155, 157) for stopping a rotation of said first longitudinal element (210) with respect to said first support structure (211a) when said first longitudinal element (210) is in said first or second position;
second means (128, 130, 131, 255, 257) for stopping a rotation of said second longitudinal element (110) with respect to said fourth support structure (111a) when said second longitudinal element (110) is in said first or second position.

13. A device (50, 50a, 50b) according to claim 1, wherein said first support structure (211, 211a) is integrally connected to said second support structure (211, 211b), said first connection means coinciding with said third connection means.

14. A device (50, 50a, 50b) according to claim 1, wherein said third support structure (111, 111b) is integrally connected to said fourth support structure (111, 111b), said fourth connection means coinciding with said sixth connection means.

15. A device (50, 50a, 50b) according to claim 1, wherein said fifth connection means (220, 221, 152) comprise:
- a lockbolt movable in a first seat made in said first longitudinal element (210) at said second end (216) thereof (210);
- a second seat (221) made in said second support structure (211b) and wherein said lockbolt may be at least partly accommodated when said first longitudinal element (210) is in said first position, an at least partial housing of said lockbolt in said second seat (221) preventing a rotation of said first longitudinal element (210) with respect to said first support structure (211a);
- a third seat (152) made in said third support structure (111b) and wherein said lockbolt may be at least partly accommodated when said first longitudinal element (210) is in said second position, an at least partial housing of said lockbolt in said third seat (152) preventing a rotation of said first longitudinal element (210) with respect to said first support structure (211a);
- movement means of said lockbolt in said first seat, between at least:
  - a first disengaged position, at which said lockbolt is not accommodated in said second seat (221), nor in said third seat (152) also when said first longitudinal element (210) is in said first or second position, so as to allow a rotation of said first longitudinal element (210) with respect to said first support structure (211a), and
  - a second engaged position, at which:
    - when said first longitudinal element (210) is in said first position, said lockbolt is partly accommodated in said second seat (221)
    and
    - when said first longitudinal element (210) is in said second position, said lockbolt is partly accommodated in said third seat (152).

16. A device (50, 50a, 50b) according to claim 15, wherein said eighth connection means (120, 121, 252) comprise:
- a lockbolt movable in a first seat made in said second longitudinal element (110) at said second end (116) thereof (110);
- a second seat (121) made in said third support structure (111b) and wherein said lockbolt may be at least partly accommodated when said second longitudinal element (110) is in said first position, an at least partial housing of said lockbolt in said second seat (121) preventing a rotation of said second longitudinal element (110) with respect to said fourth support structure (111a);
- a third seat (252) made in said second support structure (211b) and wherein said lockbolt may be at least partly accommodated when said second longitudinal element (110) is in said second position, an at least partial housing of said lockbolt in said third seat (252) preventing a rotation of said second longitudinal element (110) with respect to said fourth support structure (111a);
- movement means of said lockbolt in said first seat, between at least:
  - a first disengaged position, at which said lockbolt is not accommodated in said second seat (121), nor in said third seat (252) also when said first longitudinal element (110) is in said first or second position, so as to allow a rotation of said second longitudinal element (110) with respect to said fourth support structure (111a), and
  - a second engaged position, at which:
    - when said second longitudinal element (110) is in said first position, said lockbolt is partly accommodated in said second seat (121)
    and
    - when said second longitudinal element (110) is in said second position, said lockbolt is partly accommodated in said third seat (252).

17. A device (50, 50a, 50b) according to claim 1, further comprising:
- first means (228, 230, 231, 155, 157) for stopping a rotation of said first longitudinal element (210) with respect to said first support structure (211a) when said first longitudinal element (210) is in said first or second position;
- second means (128, 130, 131, 255, 257) for stopping a rotation of said second longitudinal element (110) with respect to said fourth support structure (111a) when said second longitudinal element (110) is in said first or second position.

18. A device (50, 50a, 50b) according to claim 1, further comprising control means connected to said first locking means (220, 221, 152) and suitable for controlling the latter to lock said first longitudinal element (210) in said first or second position, and to release said first longitudinal element (210) from said first or second position, said control means also being connected to said second locking means (120, 121, 252) and also being suitable for controlling the latter to lock said second longitudinal element (110) in said first or second position, and to release said second longitudinal element (110) from said first or second position.

19. A motor vehicle (5) provided with a luggage boot according to claim 1.

20. A luggage boot which is connectable to a motor vehicle (5), said luggage boot comprising:
- a first bar (3) and a second bar (2) which are connectable to said roof (5) of the motor vehicle so as to be arranged substantially parallel to each other;
- a first longitudinal element (210) comprising a first end (209) and a second end (206) opposite to said first end (209);
- connection means (214) between said first end (209) of said first longitudinal element (210) and said first bar (3), said connection means (214) being suitable for allowing a rotation of said first longitudinal element (210), with respect to said first bar (3), between at least:
  - a first position at which said first longitudinal element (210) is arranged substantially parallel to said first bar (3)
  and
  - a second position at which said first longitudinal element (210) is arranged transversely to said first bar (3);

first locking means (111*b*, 118, 211*b*, 218, 220, 221, 152) suitable for reversibly locking said first longitudinal element (210) with respect to said first bar (3) when said first longitudinal element (210) is in said first or second position, said first locking means comprising connection means (220, 221, 152) suitable for reversibly connecting said first longitudinal element (210):

to said first bar (3) when said first longitudinal element (210) is in said first position and to said second bar (2) when said first longitudinal element (210) is in said second position, a connection between said first longitudinal element (210) and said first bar (3) or said second bar (2) by means of said connection means (220, 221, 152) comprised in said first locking means being such as to prevent a rotation between said first longitudinal element (210) and said first bar (3), said luggage boot further comprising:

a second longitudinal element (110) comprising a first end (109) and a second end (116) opposite to said first end (110);

connection means (114) between said first end (109) of said second longitudinal element (110*a*) and said second bar (2), said connection means (114) between said first end (109) and said second bar (2) being suitable for allowing a rotation of said second longitudinal element (110), with respect to said second bar (2), between at least:

a first position at which said second longitudinal element (110) is arranged substantially parallel to said first longitudinal element (210) when also the latter is in said first position and a second position at which said second longitudinal element (110) is arranged transversely to how said second longitudinal element is arranged in said first position;

second locking means (120, 121, 252) suitable for reversibly locking said second longitudinal element (110) with respect to said second bar (2) when said second longitudinal element (110) is in said first or second position, said second locking means comprising connection means (120, 121, 252) suitable for reversibly connecting said second longitudinal element (110):

to said second bar (2) when said second longitudinal element (110) is in said first position and to said first bar (3) when said second longitudinal element (110) is in said second position, a connection between said second longitudinal element (110) and said first bar (2) or said second bar (2) by means of said connection means (120, 121, 252) comprised in said second locking means being such as to prevent a rotation between said second longitudinal element (110) and said second bar (2).

* * * * *